(No Model.) 2 Sheets—Sheet 1.
F. H. BOLTE.
WORKMAN'S TIME RECORDER.
No. 491,978. Patented Feb. 21, 1893.
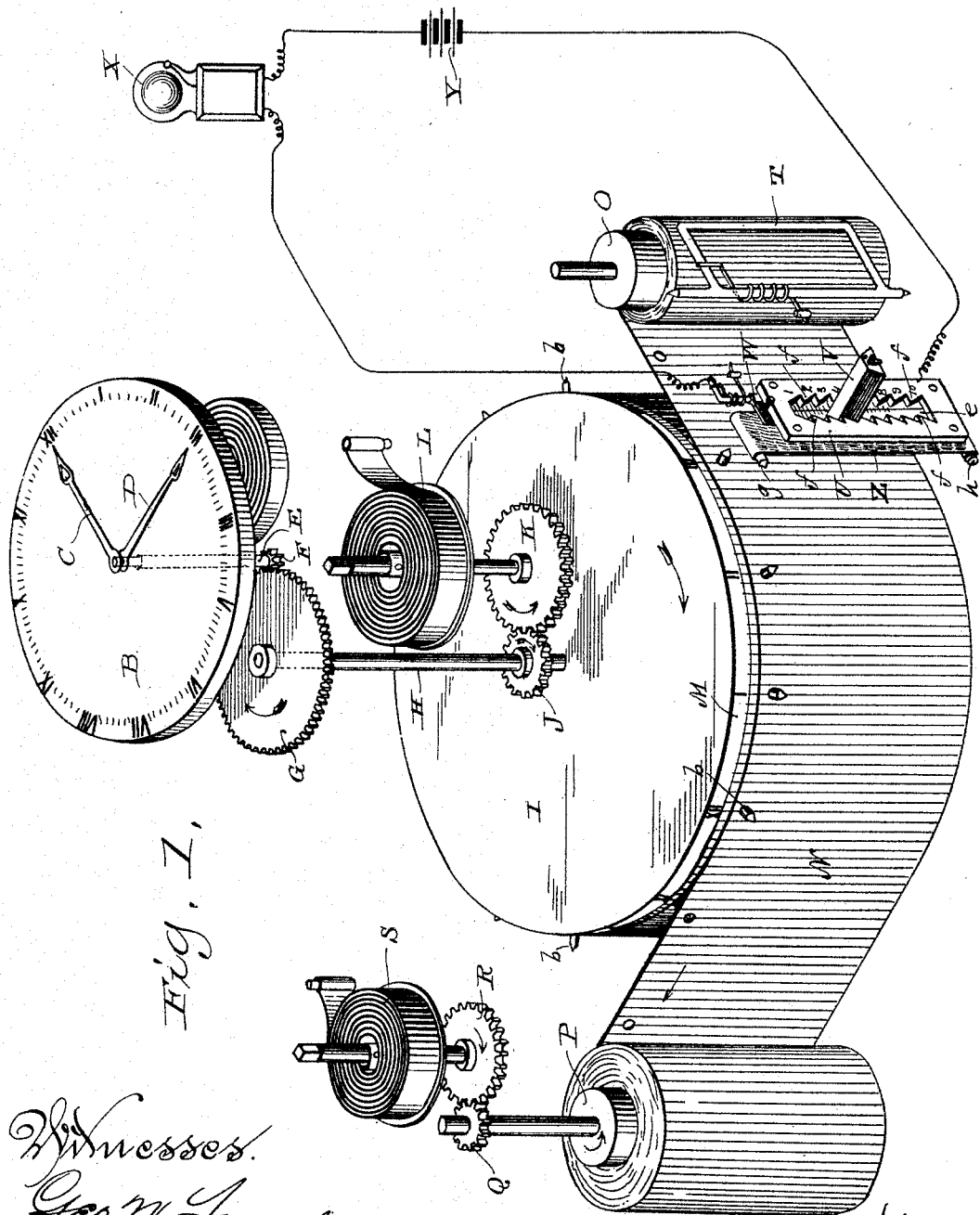

(No Model.) 2 Sheets—Sheet 2.
F. H. BOLTE.
WORKMAN'S TIME RECORDER.
No. 491,978. Patented Feb. 21, 1893.
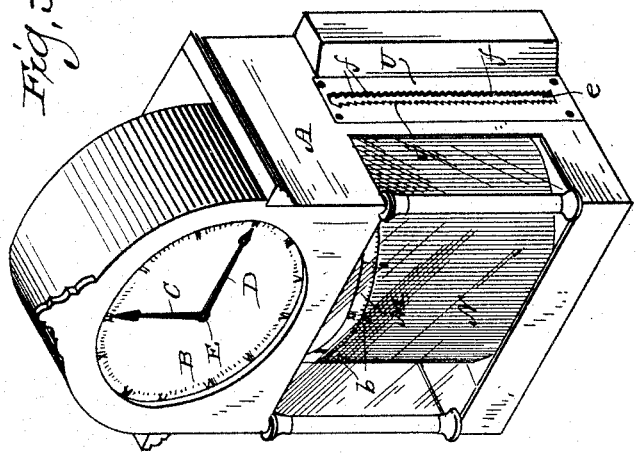
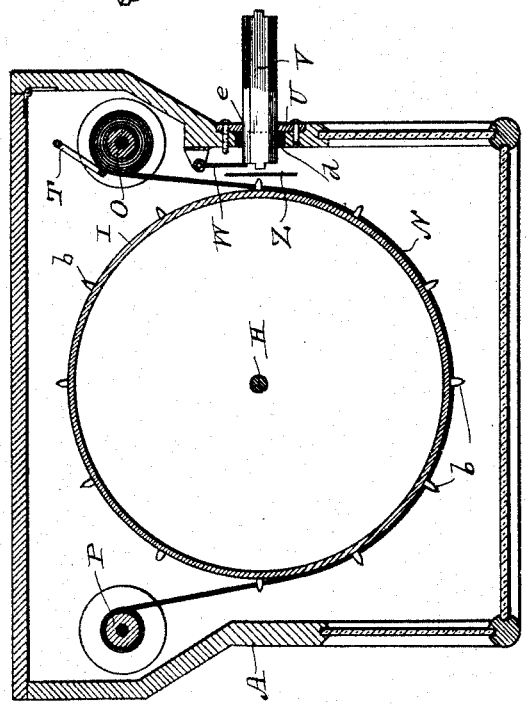
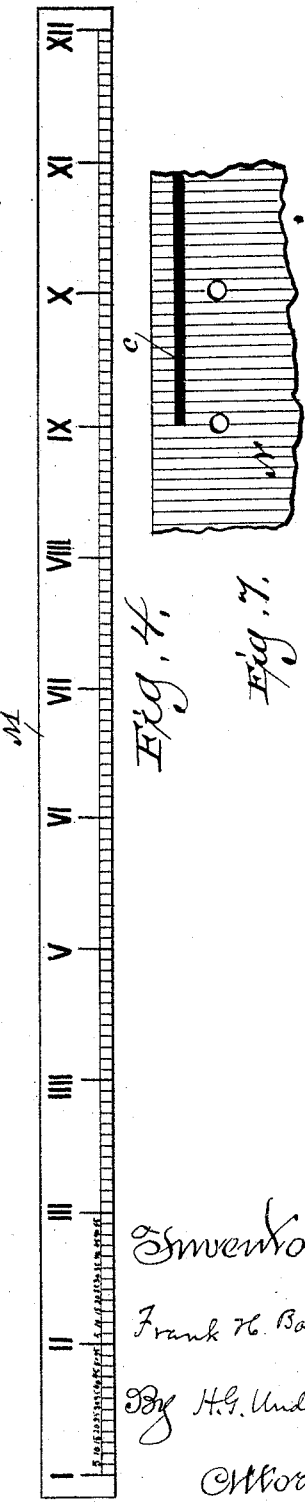
Witnesses
Geo. W. Young,
N. E. Oliphant.
Inventor
Frank H. Bolte
By H. G. Underwood
Attorneys

UNITED STATES PATENT OFFICE.

FRANK H. BOLTE, OF MILWAUKEE, WISCONSIN, ASSIGNOR OF TWO-THIRDS TO PARKER H. SERCOMBE AND THOMAS A. DONLEVY, OF SAME PLACE.

WORKMAN'S TIME-RECORDER.

SPECIFICATION forming part of Letters Patent No. 491,978, dated February 21, 1893.

Application filed August 6, 1892. Serial No. 442,307. (No model.)

*To all whom it may concern:*

Be it known that I, FRANK H. BOLTE, a citizen of the United States, and a resident of Milwaukee, in the county of Milwaukee, and in the State of Wisconsin, have invented certain new and useful Improvements in Time-Recorders; and I do hereby declare that the following is a full, clear, and exact description thereof.

My invention has for its object to provide a simple mechanism operated in connection with a standard clock for the purpose of accurately recording the time of arrival, or departure, or both, of employés in factories and various other concerns, especially those wherein the amount of wages due each employé is figured on a basis of a certain sum per hour for time actually served.

A further object of my invention is to provide for keeping a registered time of arrival or departure in plain sight for several hours, as well as to show whether a person, making an entry upon the record, worked on a day or night force at the time of making the record.

My invention therefore consists in certain peculiarities of construction and combination of parts hereinafter described with reference to the accompanying drawings and subsequently claimed.

In the drawings: Figure 1, is a diagram of my time recording mechanism, Fig. 2, a horizontal section illustrating certain elements of said mechanism in their relative arrangement within a casing, Fig. 3, a perspective view of my complete device, Fig. 4, a projection of a time-scheme delineated at one end of a rotative drum constituting a part of the aforesaid mechanism, Figs. 5 and 6, end elevations of a registering key, and Fig. 7, an elevation of a portion of a record-sheet constituting part of my invention.

Referring by letter to the drawings A repsents a casing constituting part of my complete device, and, as shown, the front and sides of this casing are partly of transparent material for the purpose of exposing certain of the contents to view.

In the present organization of my device, the major portion of the casing is hinged to the back of the same, as shown in Fig. 2, in order that it may be swung out therefrom to permit of access to the mechanism arranged therein, but ordinarily said casing will remain closed and under lock.

Arranged in the casing A is a standard clock having the dial B and hands C, D, thereof exposed through a transparent portion of said casing. Inasmuch as suitable clocks of various and well known makes can be had in open market, no attempt has been made to illustrate the structural details of the same.

For my purpose the arbor E of the minute hand C is made of a suitable length and has a pinion F fast thereon, this pinion being preferably in proportion of one to twelve of a suitable gear-wheel G in mesh therewith and fast on the arbor H of a drum I hereinafter more fully described. Fast on the drum-arbor H is a pinion J in mesh with a spur-wheel K that forms part of any suitable motor (spring or otherwise) L by which motion is imparted to the drum.

As shown the drum has a circumferential time-scheme M delineated on its upper end, this time-scheme being preferably in the form of a band of flexible material divided by suitable ruling, into spaces each of which represents a five minute division of one hour, and as shown in Fig. 4, the hour marks may be indicated by Roman numerals, and the five minute sub-divisions by Arabic numerals. The drum is also shown as provided with a series of projections $b$ adjacent to the circumferential time-scheme and equi-distant apart. These projections successively engage and disengage corresponding openings in a sheet of flexible material N that unwinds from a roller O onto another róller P, a journal of the latter roller being provided with a pinion Q (fast thereon) that meshes with a spur-wheel R forming part of any suitable motor S (spring or otherwise) by which motion is imparted to said latter roller, the unwind of the flexible sheet N from the former roller being governed by a spring controlled pivotal tension bar T fully illustrated in Fig. 1.

The flexible sheet N is ruled to correspond with the fractional divisions of hours denoted on the time scheme M above specified, and as shown in Fig. 7, a heavy longitudinal line $c$ or other suitable arbitrary marking may be made on said flexible sheet at regular intervals to denote a certain division of twenty four hours, as for instance, from six o'clock p. m. to six o'clock a. m., the purpose of this division being hereinafter specified.

In the arrangement of parts herein shown, a certain portion, covering a period of several hours, of the flexible sheet N is exposed through a transparent portion of the casing A, as best shown in Fig. 3, and thus records made on said sheet, by means hereinafter described, will be in view for several hours, dependent on the diameter of the drum, with which the aforesaid sheet is in friction contact, and the width of said transparent portion of the casing.

As shown one side of the casing A has a vertical opening $d$ therein and this opening is faced by a metallic plate U having a corresponding opening $e$ provided with lateral extensions $f$ at certain intervals, whereby a series of horizontal guides for metallic keys V are formed on a line parallel to the axis of the drum I, these guides being preferably of a dove-tail form to insure of the keys being properly positioned at the time of insertion. Each key has at least one end thereof provided with an arbitrary design such as a character or characters representing a number, preferably in relief, as shown in Fig. 5, and it is also preferable to have the other end of the key provided with a like design and some other arbitrary device such as a star line or dot in addition thereto as shown in Fig. 6. It is also preferable in practice, to have the key in two colors, shown by a peculiar shading in Fig. 2, each color being an index to the design on the corresponding end of said key, and the guides in the plate U may be indexed by designs corresponding to those on the keys, as shown in Fig. 1.

As shown, the guide plate U, a spring controlled contact plate W parallel thereto, and an audible signal X are wired to a battery Y or other suitable source of electricity, as shown in Fig. 1, the contact plate being in the path of non-relief portions of the keys V, as shown in Fig. 2.

In opposition to the relief portions of the keys V parallel to the guide-plate U, I arrange an ink-ribbon Z, that is also parallel to the flexible sheet N that moves with the drum I, above specified, this ink-ribbon being preferably connected to rollers $g, h$, and wound from one to the other as occasion may require.

From the foregoing description it will be evident that the drum I and flexible sheet N are independently actuated by means other than the clock but as said drum is geared to the minute-hand arbor of the clock it is retarded or governed, as to rotation, by the movement of the clock-train (not shown) and the motor-controlled roller P acts merely as a take up for the flexible sheet N unwound from the roller O by the action of the aforesaid drum. The radial projections $b$ on the drum engaging the openings in the flexible sheet N causes a propulsion of the latter and insures the same against slipping on said drum, but in practice other suitable means for accomplishing these results may be devised, and therefore I do not wish to be understood as limiting myself to these details of construction.

In a factory or other concern employing a mechanism similar to that above described each employé will be furnished with a key having a design thereon different from those on all the other keys in a series corresponding to the guides in the plate U, all the guides being of the same general contour or otherwise, as practice may determine to be most desirable, it being obvious that if these contours be various it will be impossible to insert any one of said keys in any but the guide that is designed therefor. The employé on coming to work inserts his key into the proper one of the guides with the end shown in Fig. 5, innermost and by pushing inward makes contact with the plate W to thereby close the electric circuit and actuate the audible signal X, while at the same time the design on said key pressing the ink-ribbon Z against the opposing flexible sheet N causes said design to be registered on said sheet. Inasmuch as the flexible sheet moves in time with the clock each record will eventually appear to view through the adjacent transparent portion of the casing A, and may be checked off any time within several hours, or before it passes out of sight toward the winding roller P, the time-scheme M delineated on the drum I being in register with the spaces on said sheet and so arranged that its divisions correspond with those on the clock-dial, or in other words when the clock-hands denote an even hour on the dial, say three o'clock, as illustrated in Figs. 1 and 3, the corresponding hour mark on said time-scheme or drum will be opposite the key guides in the casing, and every five minutes thereafter will be occupied by one of the spaces between division lines on said time-scheme and aforesaid flexible sheet passing said key-guides.

An employé leaving work makes a record with that end of his key shown in Fig. 6, the dot or other device in addition to the general design on said key making its impress on the record sheet to show that said employé quit work at the time of making said record. In practice it is preferable to have those portions of the record-sheet provided with a heavy longitudinal line $c$, or other arbitrary marking equal in length and alternate with the remaining portions of said sheet, which latter, as a matter of preference, is arranged and operated to have one of the arbitrarily designated portions thereof in transit across the registering point during the hours from six p. m. to six a. m., in any one day of twenty-four hours, whereby the record thereon will show for night work, such work being generally paid for at a higher rate than day-work.

While in the proportions shown and described, the drum has a revolution once in every twelve hours these proportions may be such as to have said drum rotate once in every twenty-four hours, or at longer intervals, in which case there will be two or more successive time-schemes M delineated thereon, or if the clock-dial shows the hours numbered one to twenty-four inclusive, the aforesaid drum will be provided with one or more corresponding time-schemes, but these matters of detail in no way effect the scope of my invention.

The record sheet may be of any desirable length, but one having a scheme covering a period of thirty days will be sufficient, as a rule, and when wound from one roller to another it will be removed and a new one substituted, the old one being filed away for future reference if desirable.

While the keys and ink-ribbon herein described are perhaps the preferable means for making entries on the record sheet, other means may be devised for the same purpose and therefore I do not wish to be understood as limiting myself to said keys and ink-ribbon, as a means for accomplishing the desired result, and it is also possible to have time-schemes on the record-sheet instead of on said drum, although the latter arrangement of a time-scheme or schemes is preferable, as a matter of convenience and economy.

Having now fully described my invention, what I claim as new, and desire to secure by Letters Patent, is—

1. The combination of a clock, a drum having a rotation governed by the clock, a motor for the drum independent of the clock, a record-sheet propelled by the drum, a series of metallic guides on a line parallel to the axis of said drum in opposition to the record-sheet, an interposed ink-ribbon, metallic printing-keys for insertion in the guides against the ink-ribbon and said record-sheet, a contact plate in the path of the printing-keys, and an audible signal and source of electric generation in circuit with the guides and contact-plate, substantially as set forth.

2. The combination of a clock, a drum having a rotation governed by the clock, a motor for the drum independent of the clock, a record-sheet under propulsion by the drum and having contrasting alternate longitudinal divisions indicative of certain periods of time in a day of twenty-four hours, and suitable means for making entries on the record-sheet, substantially as set forth.

3. The combination of a clock, a drum having a rotation synchronous with the clock, a record-sheet propelled by the drum, a series of guides on a line parallel to the axis of said drum in opposition to the record-sheet, an interposed ink-ribbon, and keys for insertion in the guides, each key being in contrasting colors that index its ends, and having both the latter provided with a like arbitrary design one of which is supplemented by some arbitrary symbol, substantially as set forth.

4. The combination of a partly transparent casing, a clock having the dial and hands thereof exposed through a transparent portion of the casing, a pinion on the minute-hand arbor of the clock, a shaft carrying a drum and gear-wheel, which latter is in mesh with said pinion, a motor geared to said shaft independent of the clock, a record-sheet propelled by the motor and also exposed through a transparent portion of said casing, a series of guides in the aforesaid casing arranged on a line parallel to the drum-shaft, an ink-ribbon interposed between the guides and record-sheet, and printing keys corresponding to said guides, substantially as set forth.

5. The combination of a partly transparent casing, a clock having the dial and hands thereof exposed through a transparent portion of the casing, a pinion on the minute-hand arbor of the clock, a shaft carrying a drum and gear-wheel, which latter is in mesh with said pinion, an independent motor geared to said shaft, a roller, a record-sheet wound thereon to be unwound therefrom by the drum in view through a transparent portion of said casing, a tension device governing the unwind of the record-sheet, a take-up roller for the record-sheet, an independent motor geared to the take-up roller, a series of metallic guides in the aforesaid casing parallel to the drum shaft, an ink-ribbon and contact-plate interposed between the guides and said record-sheet, metallic printing keys for insertion in the guides, and an electric signal in circuit with said guides and contact-plate, substantially as set forth.

6. The combination of a clock, a record-sheet traveled synchronous with the clock, a series of metallic guides on a line transverse to the travel of the record-sheet, an interposed ink-ribbon, metallic printing keys for insertion in the guides against the ink-ribbon and said record-sheet a contact-plate in the paths of the keys, and an audible signal and source of electric generation in circuit with the guides and contact-plate, substantially as set forth.

7. The combination of a clock, a record-sheet traveled synchronous with the clock, a series of guides on a line transverse to the travel of the sheet, an interposed ink-ribbon, keys for insertion in the guides against the ink-ribbon and record-sheet, both ends of each key being provided with a printing device and suitable means for indexing the ends of each key, substantially as set forth.

In testimony that I claim the foregoing I have hereunto set my hand, at Milwaukee, in the county of Milwaukee and State of Wisconsin, in the presence of two witnesses.

FRANK H. BOLTE.

Witnesses:
N. E. OLIPHANT,
H. H. MEIXSELL.